(12) United States Patent
Annam

(10) Patent No.: US 10,275,736 B1
(45) Date of Patent: Apr. 30, 2019

(54) UPDATING INFORMATION IN A PRODUCT DATABASE

(71) Applicant: Google LLC, Mountain View, CA (US)

(72) Inventor: Srinivas Annam, San Ramon, CA (US)

(73) Assignee: Google LLC, Mountain View, CA (US)

( * ) Notice: Subject to any disclaimer, the term of this patent is extended or adjusted under 35 U.S.C. 154(b) by 1023 days.

(21) Appl. No.: 13/707,469

(22) Filed: Dec. 6, 2012

(51) Int. Cl.
 *G06Q 10/08* (2012.01)
 *G06F 17/30* (2006.01)

(52) U.S. Cl.
 CPC .................. *G06Q 10/087* (2013.01)

(58) Field of Classification Search
 USPC .......................................... 705/28
 See application file for complete search history.

(56) References Cited

U.S. PATENT DOCUMENTS

| | | | |
|---|---|---|---|
| 7,478,130 B2 * | 1/2009 | Aoki ...................... | G06F 9/542 709/206 |
| 7,797,204 B2 * | 9/2010 | Balent ................ | G06Q 30/0633 705/26.8 |
| 2009/0222485 A1 * | 9/2009 | Wassmann ........ | G06F 17/30864 |

* cited by examiner

*Primary Examiner* — Garcia Ade
(74) *Attorney, Agent, or Firm* — Shumaker & Sieffert, P.A.

(57) ABSTRACT

An update server receives update instructions from a client. The update instructions comprise a text string containing an expression specifying an update to product information stored in a product database of an electronic marketplace. After parsing the update instructions into tokens, the update server interprets the tokens to obtain a product identifier and an action to perform to update the product information. The update server then performs the action on the product information, where the action may include changing the product's price or changing information for a specified date range. By using update instructions comprising a text string, a user of the client can quickly update the product information for a set of products.

18 Claims, 4 Drawing Sheets

UPDATING INFORMATION IN A PRODUCT DATABASE

BACKGROUND

1. Technical Field

This disclosure relates in general to electronic commerce and in particular to updating information about products sold in an electronic marketplace.

2. Background

Electronic commerce on the Internet has become commonplace. There are many merchants offering products for sale on the Internet, and there are an even greater number of customers who purchase such products. For example, many consumers purchase products containing media such as music, movies, and books via the Internet.

In some electronic commerce environments, an entity operates a marketplace through which the entity and other merchants can sell products. For example, the marketplace may be located at a website that consumers visit to browse products from many different online merchants. When the marketplace contains a large number of items, it is time-consuming and cumbersome to change information relating to the products. Merchants may provide the entity that operates the marketplace with spreadsheets containing updated product information, but if the updated product information is not in a format that can be readily exported to a spreadsheet the time required to create and provide the spreadsheets renders this method inefficient, especially in environments where product information is frequently updated.

SUMMARY

A method, non-transitory computer-readable storage medium, and computer system for updating product information in a product database of an electronic marketplace are described herein. One aspect of the method comprises receiving update instructions comprising a text string containing an expression specifying an update to product information stored in the product database. The method parses the expression contained in the update instructions to obtain a product identifier identifying a set of products having associated product information in the product database and to determine a specified action to perform to update the product information associated with the set of products. The method additionally performs the specified action on the product information associated with the set of products.

Another aspect provides a non-transitory computer-readable storage medium storing computer program instructions for updating product information in a product database of an electronic marketplace. The computer program instructions are executable to perform steps comprising receiving update instructions comprising a text string containing an expression specifying an update to product information stored in the product database. The computer program instructions are also executable to parse the expression contained in the update instructions to obtain a product identifier identifying a set of products having associated product information in the product database and to determine a specified action to perform to update the product information associated with the set of products. The computer program instructions are further executable to perform the specified action on the product information associated with the set of products.

Yet another aspect provides a computer system for updating product information in a product database of an electronic marketplace. The computer system comprises a non-transitory computer-readable storage medium storing executable program code. The computer program instructions are executable to perform steps comprising receiving update instructions comprising a text string containing an expression specifying an update to product information stored in the product database. The computer program instructions are also executable to parse the expression contained in the update instructions to obtain a product identifier identifying a set of products having associated product information in the product database and to determine a specified action to perform to update the product information associated with the set of products. The computer program instructions are further executable to perform the specified action on the product information associated with the set of products. The computer system further comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
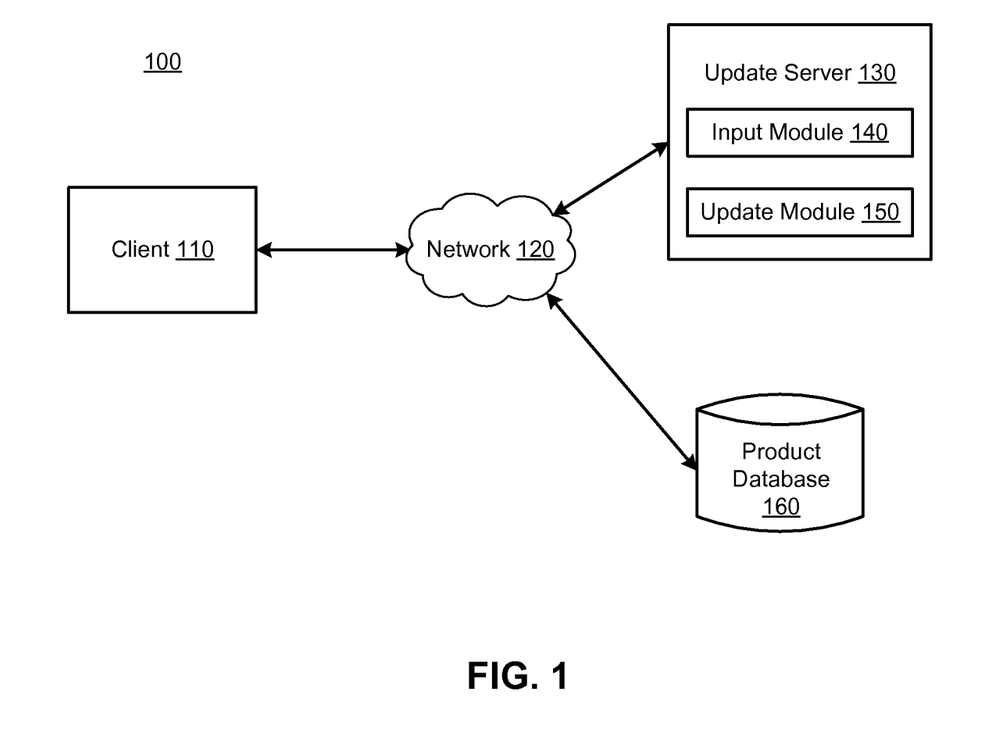
FIG. 1 is a high-level block diagram of a computing environment for updating information in a product database according to one embodiment.

FIG. 1 is a high-level block diagram of a computing environment 100 for updating information in a product database 160, according to one embodiment. The environment 100 includes a client 110, update server 130, and product database 160 connected via a network 120. While only one client 110, update server 130, and product database 160 are shown in FIG. 1, the environment 100 may include many clients as well as multiple update servers and product databases. Other entities may also be to the connected to the network 120.

In one embodiment, the update server 130 and product database 160 are associated with an electronic marketplace. The electronic marketplace is operated by an entity called the "marketplace operator" and may be located at one or more web sites on the Internet. The marketplace provides web pages to customers using web browsers, and the customers can view information on the web pages and interact with the pages to purchase products from a merchant. The merchant may also be the marketplace operator. In addition, the merchant may be a partner of the marketplace operator.

In this latter embodiment, the marketplace may sell products from multiple different merchants that partner with the marketplace operator.

The product database 160 stores products and/or information about products for sale in the electronic marketplace. Depending upon the embodiment, the product database 160 may be a relational database, a distributed database, or another type of database. The database 160 may also have multiple shards or other portions located at different physical locations. An embodiment of the product database 160 holds information as a set of records, with each record containing multiple fields.

As mentioned above, the products may be sold by the marketplace on behalf of one or more merchants. In one embodiment, the products include various forms of media content such as books, videos, applications, and music. The marketplace may sell these products in electronic and/or physical form. For electronic products, the product database 160 may store the content of the product. The marketplace may also sell other types of electronic and physical products.

The information about products stored in the database 160 includes metadata describing the products. Each product has associated metadata that describe aspects of the product. The electronic marketplace may provide the metadata to consumers to allow the consumers to search or browse for products in which they are interested. Metadata may also be displayed to merchants to enable them to monitor their products in the marketplace.

In one embodiment, some of the metadata describe sale information for the products. The sale information generally describes the terms under which the product is to be sold. For example, the sale information may include an identifier of the merchant offering the product, the price for which the product is sold, the geographic regions in which the product is available to be purchased, types of consumers for which a particular price is applicable, and validity periods during which particular pricing or other sale information is applicable.

Further, some of the metadata describe product attributes. The attributes of a product described by the metadata may include, for example, the product's title, author, International Standard Book Number (ISBN), genre, language, publication year, parental control guidance, reading level, cover image, actors, and platform on which the product executes, depending on the type of product. The attributes of a product may also include a marketplace identifier that uniquely identifies the product within the electronic marketplace. The marketplace identifier may be created and assigned by the marketplace operator when a merchant adds a product to the product database 160.

The product attributes may also include one or more labels associated with a product. A merchant may explicitly associate one or more labels with a product or set of products. The labels may describe attributes of the product. For example, the merchant may explicitly assign labels such as "fiction," "non-fiction," "adult-fiction," etc. to various books. The labels may also be arbitrary labels that do not directly describe the product such as "summer sale," "promoted," and "special." The labels may also be automatically associated with product having specified metadata. For example, the marketplace operator may automatically assign the "fiction" label to products it identifies as containing a work of fiction.

The metadata may also describe search attributes of a product. The search attributes describe how the product may be searched for in the electronic marketplace. The search attributes may indicate whether potential customers can search within the text of a book product. The search attributes may also indicate how much of a product is exposed to potential customers. For example, the search attributes can indicate the extent to which a potential customer can sample the product. Thus, the search attributes can indicate the size of book snippets a potential customer can read, the length of audio samples of music a potential customer can listen to, and the length of video a potential customer can watch.

The client 110 is an electronic device used by a user to interact with the electronic marketplace and update the product information stored in the product database 160. For example, the user may use the client 110 to change the sale information, product attributes, and/or search attributes for one or more products. In one embodiment, the user of the client 110 is associated with a merchant selling products in the electronic marketplace. Therefore, the user of client 110 is referred to herein as a merchant.

In one embodiment, the client 110 is a personal computer (PC) such as a desktop, notebook, or tablet computer. In other embodiments, the client 110 is a mobile telephone, personal digital assistant, television set-top box, or other such device. The client 110 may execute a browser, which allows the merchant to interact with the update server 130 and product database 160 through the network 120.

The update server 130 interacts with clients 110 through the network 120 to update product information stored in the product database 160. In one embodiment, update server 130 comprises one or more computers executing modules for providing the functionality described herein. A merchant may provide identifying information to the update server 130. For example, the merchant may provide authentication credentials such as a user name and password in order to log into the update server 130. The update server 130 uses this identifying information to identify products in the marketplace sold by the identified merchant. Thus, different merchants may use the update server 130 to update information about the merchants' own products. In one embodiment, the electronic marketplace assigns each merchant a unique merchant identifier.

As shown in FIG. 1, the update server 130 executes an input module 140 and an update module 150. The input module 140 receives inputs from the clients 110 describing updates to perform on the product information in the product database 160. These inputs are referred to herein as "update instructions." In one embodiment, the input module 140 provides one or more web pages to a client 110 that cause the client to display a user interface (UI). The merchant uses the UI to provide update instructions to the update server 130.

The UI comprises, in one embodiment, an input box that allows a merchant to input the update instructions. In one embodiment, the input box accepts update instructions in the form of text strings containing expressions describing the updates to perform. The update instructions identify one or more products in the database and describe one or more actions to perform on the identified products, such as updating the metadata associated with a product. For example, to change the price of the book corresponding to ISBN 0123456789 to $9.99, a merchant may use the input box to provide the update instruction:

"ISBN: 0123456789=$9.99."

The UI may also include additional elements, such as a "submit" button that a merchant selects in order to transmit the update instructions in the input box to the input module 140.

In one embodiment, the UI provided by the input module 140 includes a "wizard" with which the merchant may interact to formulate the update instructions. The wizard provides the merchant with a sequence of dialog boxes or other UI tools that lead the merchant through a series of steps and selections that collectively describe the update desired by the merchant. For example, a merchant may enter data into fields in the UI of the wizard that identify the products and actions to perform. Upon receiving an indication that all desired data has been entered, the wizard transforms the data provided by the merchant into an expression in the input box contain the update instructions that effectuate the desired update.

Further, the input module 140 may accept update instructions in formats other than text strings. The input module 140 may accept files containing images or other data to store in the product database 160 in association with a product. For example, the UI provided by the input module 140 may automatically upload the contents of files dragged and dropped into the input box to the update server 130. Likewise, the UI may allow the merchant to specify the name and path of a file, and then upload the specified file to the update server 130.

The update module 150 updates the product information in the product database 160 based on the update instructions received by the input module 140. Updates may include making changes to the sale information, product attributes, and/or search attributes described by the metadata. Thus, an update may modify the price of a product as shown in the example described above. Updates may also update data to perform tasks such as associating a different cover image with a product, changing the title of a product, and adding a new product to the product database 160. In one embodiment, the update module 150 provides the client 110 with one or more UIs to seek confirmation of an update to be performed and/or describe the results of a performed update.

Use of the input box provided by the update server 130 thus allows a merchant to easily and reliably update prices and other metadata associated with one or more products. The merchant can use text-based update instructions to efficiently identify products to which an update pertains and describe the updates to perform on the products. As a result, use of the update server 130 facilitates rapid updating of product metadata.

The network 120 enables communications among the clients 110, the update server 130 and product database 160 and can comprise the Internet as well as mobile telephone networks. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
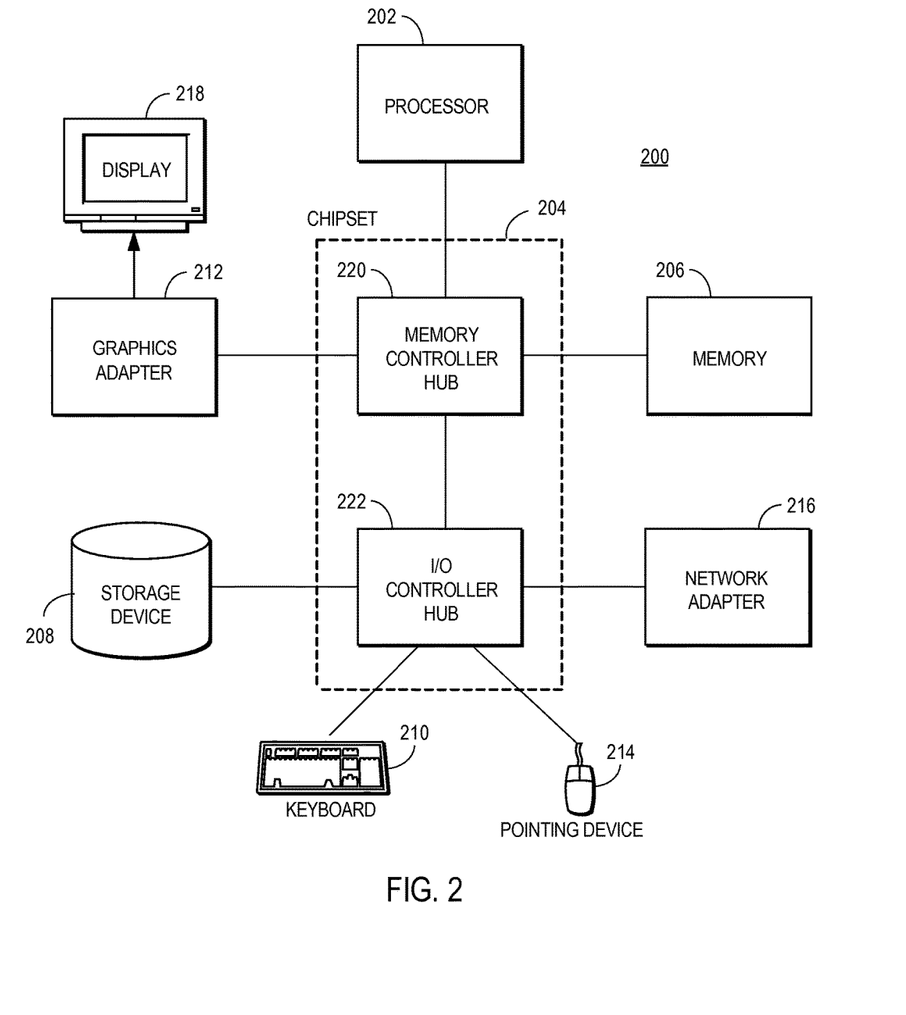
FIG. 2 is a high-level block diagram of a computer for use as the client devices, and/or update server illustrated in the communications environment shown in FIG. 1.

FIG. 2 is a high-level block diagram of a computer 200 for acting as a client 110 and/or update server 130 in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as an update server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
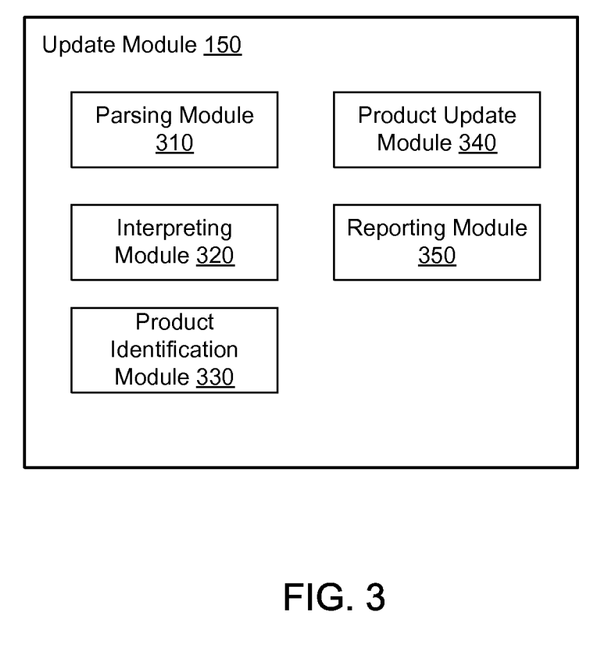
FIG. 3 is a high-level block diagram illustrating modules within the update module according to one embodiment.

FIG. 3 is a high-level block diagram illustrating modules within the update module 150 according to one embodiment. As shown in FIG. 3, the update module 150 includes a parsing module 310, an interpreting module 320, a product identification module 330, a product update module 340, and a reporting module 350. Other embodiments of the update module 150 can have different and/or other modules than the ones described here, and the functionalities can be distributed among the modules in a different manner.

The parsing module 310 receives a merchant's update instructions from the input module 140. As mentioned above, in one embodiment the update instructions are received as a text string containing an expression describing the update to perform. The parsing module 310 uses a grammar to parse the text string into a sequence of tokens. To this end, the parsing module 310 performs a lexical analysis of the update instructions using regular expressions and/or other techniques in order to recognize the tokens in the text string. A token is a categorized set of characters from the text string. The parsing module 310 may be implemented using standard or custom lexing and/or parsing tools, such as Lex and YACC or ANTLR.

The parsing module 310 also performs a syntactical analysis that verifies that the tokens describe an update instruction. In one embodiment, a valid update instruction includes tokens representing a product identifier, an operator, and a value. The update instructions may also include tokens representing other components of the expression, such as separators for separating other tokens.

In one embodiment, the grammar of update instructions enforced by the parsing module 310 is represented as an identifier followed by an operator which, in turn, is followed by a value. Different embodiments may use different grammars to represent the update instructions. The grammar may support multiple different ways to specify the identifiers, operators, and values. Some identifiers, operators, and/or values may be implicitly specified.

Generally, the product identifier identifies one or more products in the product database 160. For example, the product identify may be an ISBN, marketplace identifier, label, book title, or other information that may be used to identify a discrete set of products in the product database 160.

An operator, in turn, describes a type of update to perform on the metadata of the identified one or more products. The available operators may include an assignment operator (e.g., "=") indicating that metadata of the identified product is assigned a value, range operators for defining ranges of values such as prices and dates (e.g., before, after, from, to), delete operators identifying metadata to delete from the database 160, relational operators for testing or defining a relation between entities (e.g., greater than, less than, equal), geographic operators for specifying conditions related to geographic locations of products and/or customers, and customer operators for specifying conditions related to specific types of customers.

A value describes a new value to use in combination with the operator to update the metadata. The value may be numeric, textual, graphical, or in another format. For example, a value may include a price for a product, a title or other description of a product, an image of a product, or a label to assign to a product. As mentioned above, the value in combination with the operator describes an action to perform that updates metadata in the database 160.

For example, a sample update instruction is:
ISBN:0123456789 price=$9.99
In this sample, "ISBN: 0123456789" is an identifier that explicitly identifies a particular item in the product database 160, in this case the book having the ISBN "0123456789." The "price=" token is an operator indicating that the price metadata of the identified item is assigned a specified value. Moreover, the "$9.99" token explicitly specifies the new value of the identified item as nine US dollars and 99 cents. In one embodiment, the "price" string in the operator can be omitted and implied. Thus, the update instruction "ISBN: 0123456789=$9.99" also sets the price of the identified product to $9.99.

Another sample update instruction is:
fiction=−5%
In this sample, the identifier specifies a label and explicitly identifies all products having that label within the products' metadata. Specifically, the identifier in this sample identifies products having the "fiction" label. In this example, the assignment operator "=" again acts as a price assignment operator. The value token, "−5%" implicitly describes the new price of the identified products as being five percent less than the current prices. Thus, the update instruction "fiction=−5%" indicates to reduce the price of each product having the label "fiction" by five percent.

In addition, an embodiment of the grammar allows for multiple identifiers, operators, and values in a single update instruction. Further, the grammar may support compound update instructions that specify multiple updates to perform. For example, consider the update instruction:
ISBN:12345678 price=$9.99, rights="us, ca, uk"
This expression includes a single identifier, "ISBN: 12345678," and includes multiple actions composed of operators and values. The first action is specified by the operator/value pair "price=$9.99" and sets the price of the identified product to $9.99. The second action is specified by the operator/value pair 'rights="us, ca, uk"' and sets the rights of the identified product to the United States, Canada, and the United Kingdom (e.g., only people in these three regions have rights to purchase the identified product).

Further, an embodiment of the parsing module 310 uses a grammar that supports update instructions containing natural language expressions. For example, the parsing module 310 may accept update instructions such as:
reduce price of "fiction" 5% from 2012-04-01 to 2012-4-07
This update instruction reduces the price of products having the "fiction" label by five percent. Moreover, the update instruction specifies a validity period of the price reduction as from Apr. 4, 2012 to Apr. 7, 2012.

Yet another embodiment of the parsing module 310 uses a grammar that supports search queries. A search query can be update instructions including an identifier but no operator or value. For example, the parsing module 310 may accept a search query such as:
ISBN:12345678
This expression searches for the products having the ISBN 12345678, and returns search results to the client without updating product information. The search results include an identification of the set of products in the database having the identifier specified by the search query.

The interpreting module 320 determines the meanings of the parsed tokens and controls execution of the update instructions. In one embodiment, the interpreting module 320 analyzes parsed update instructions to identify the identifiers, operators, and values contained therein. The interpreting module 320 then interacts with other modules in the update module 150 to perform the specified actions on the identified products.

Thus, an embodiment of the interpreting module 320 uses the identifier contained in update instructions to identify the product or products in the product database 160 to which the update pertains. The interpreting module 320 also interprets the one or more operators in the update instructions to identify the metadata of the identified products to change (e.g., price) and the values in the update instructions to identify the new values for the metadata (e.g., $9.99, 5% lower than current price). The interpreting module 320 performs the update described by the update instructions on the identified product.

In one embodiment, the product identification module 330 identifies the products to update according to the update instructions. The interpreting module 320 provides the identifier in the update instructions to the product identification module 330. The latter module, in turn, interacts with the product database 160 to identify a set of the one or more products identified by the identifier. The product identification module 330 returns the set of identified products to the interpreting module 320. In one embodiment, the set of identified products includes the marketplace identifiers for the products.

The product identification module 330 analyzes the identifier in the update instructions to determine the fields of the product database 160 to search to identify products matching the identifier. In one embodiment, the product identification module 330 determines the type of identifier and then uses a pre-established schema that maps types of identifiers to fields of the product database 160. The product identification module 330 may perform a textual analysis of the identifier token in order to identify the type of identifier. The textual analysis may recognize that the substring "ISBN" indicates that the subsequent characters are an ISBN. Likewise, the textual analysis may compare the string "fiction" with a set of possible labels for the products in the product database discover that "fiction" is a genre label.

Portions of this analysis may be performed by the parsing 310 and/or interpreting 320 modules in some embodiments. In one embodiment, the product identification module 330 receives information describing the type of identifier from the interpreting module 330. For example, if the identifier in the update instructions is "ISBN:12345678," the product identification module 330 may receive information explicitly indicating that the identifier is an ISBN having the value "12345678."

For example, if the identifier is "ISBN:12345678," the analysis performed by the product identification module 330 recognizes that the identifier contains an ISBN and, therefore, it should search database fields identified by the schema as containing ISBNs to find matching products. If the identifier is "fiction," the analysis performed by the product identification module 330 identifies this identifier as a label describing the genre of the product and, therefore, it should search database fields describing the genre of the product that might contain "fiction."

In one embodiment, the product identification module 330 receives a merchant identifier from the interpreting module 320. The merchant identifier identifies the merchant that supplied the update instructions. Since in one embodiment a merchant can only update the merchant's own products, the merchant identifier also identifies the set of products in the product database 160 that can be updated by the update instructions from that merchant.

The product identification module 330 may receive the merchant identifier within the update instructions. For example, the interpreting module 320 can determine the merchant and add a merchant identifier to the update instructions it sends to the product identification module 330. Additionally, the product identification module 330 may receive the merchant identifier from the interpreting module 320 apart from the update instructions, or from a different module within the update module 150.

In one embodiment, the product identification module 330 combines the merchant identifier with the product identifier using a logical "AND." Thus, if the identifier is "ISBN: 12345678" and the merchant identifier identifies merchant A, the product identification module 330 searches the product database 160 for products having the ISBN "12345678" and from merchant A. This search produces a set containing the marketplace identifiers of products having the specified ISBN from merchant A. The product identification module 330 returns this set of identified products to the interpreting module 320. Use of the merchant identifier thus prevents one merchant from updating products sold by another merchant, even if both merchants' products share the same product identifier (e.g., "ISBN:12345678").

The interpreting module 320 interacts with the product update module 340 to perform the action specified by the update instructions on the identified products in the set returned by the product identification module 330. In one embodiment, interpreting module 320 sends the set of products returned by the product identification module 330 to the product update module 340. The interpreting module 340 also instructs the product update module 340 to perform the one or more actions specified by the update instructions.

The product update module 340 receives the set of identified product and the one or more actions and performs the actions on the products. Generally, the product update module 340 performs the actions by updating the metadata for the identified products in the product database 160. For a given product, the product update module 340 determines the specific product in the database 160 using the marketplace identifier returned by the product identification module 330. The product update module 340 changes the appropriate metadata for the identified product as per the action specified by the interpreting module 340. The product update module 340 may also add new metadata, or new products, to the product database 160 depending upon the specified action.

As mentioned above, the value in the update instructions may be an absolute value (e.g., $9.99) or a relative value (e.g., −5%). In the case of an update using an absolute value, an embodiment of the product update module 340 changes the product's metadata to reflect the new absolute value. For example, if the product's metadata indicate that the price of a product is $19.99 and the new price according to the action from the interpreting module 340 is $9.99, the product update module 340 changes the metadata to indicate the new price.

In the case of an update using a relative value, an embodiment of the product update module 340 reads the current value of the appropriate metadata from the product database 160, and then calculates the new value for the metadata using the relative value. For example, if the action specifies that the price of a product be discounted by a certain percentage, the product update module 340 calculates the new price based on the product's current price and the discount percentage. Thus, if the product's current metadata indicate that the price of a product is $20.00, and the new price according to the specified action is −%5 (i.e., five percent less than the current price), the product update module 340 calculates the new price of the product as $20.00−(5% of $20.00)=$19.00. The product update module 340 changes the metadata for the product to indicate the calculated new price.

In one embodiment, the product update module 340 updates the metadata according to a schedule indicated in the action. For example, the action may indicate that the price of a product is reduced by 5% only within a specified date range (e.g., from 2012 Apr. 1 to 2012 Apr. 7). To perform this type of update, an embodiment of the product update module 340 maintains a clock and/or timer to determine a current date/time and monitor the range over which an update is effective. At the beginning of the specified range (e.g., time period) the product update module 340 performs the metadata update. At the end of the specified range, the product update module 340 automatically restores the previous value of the metadata or otherwise reverses the update.

The reporting module 350 provides reports describing the operation of the update module 150 to the merchants using the clients 110. The reports may describe the products in the product database 160 as well as actions that were performed by the update module 150. The reports may also seek feedback from a merchant, such as seeking confirmation for actions to be performed by the update module 150 or providing an interface for undoing an action previously performed by the update module. The reporting module 350 interacts with the other modules in the update module 150 to obtain the information for the reports and perform any actions indicated by merchant feedback.

In one embodiment, the functions of the reporting module 350 are user-configurable. Thus, individual merchants may configure the reporting module 350 to control the types of reports sent by the reporting module, the types of information in the reports, and when the reports are sent. For example, a merchant can configure the reporting module 350 to send a report seeking confirmation for an action to be performed if an action will change metadata for more than a threshold number of products.

In one embodiment, the reporting module 350 includes the reports in UIs provided to the merchants' clients 110. The reporting module 350 may provide a report with a UI allowing a merchant to review and alter the set of products to which an update will be performed. This report lists the products identified by the product identification module 330 based on the update instructions and seeks confirmation to perform the update. For example, the report may be formatted as a table that lists each product and associated metadata about the product, such as the metadata to be changed by the update instruction, on a separate row. Each product listed in the table may have an associated checkbox or other UI element with which the merchant can select or deselect the individual product for updating. If the merchant selects or deselects a product, the reporting module 350 informs the other modules in the update module 150 of the selection. Thus, if the merchant deselects a product from updating, the reporting module 350 may inform the interpreting module 320 to remove the deselected product from the set of products sent to the product update module 340.

The reporting module 350 may also provide a report with a UI allowing a merchant to review and undo actions such as metadata updates made by the update module 150. This report lists the products to which an update was performed and show the initial and changed metadata (e.g., the original and the new price of a product). Each product listed in the table has an associated "undo" button, checkbox or other UI element with which the merchant can confirm or undo the update. If the merchant uses the UI to select an update to undo, the reporting module 350 interacts with the interpreting module 320 and/or product update module 340 to reverse the update.

Figure 4:
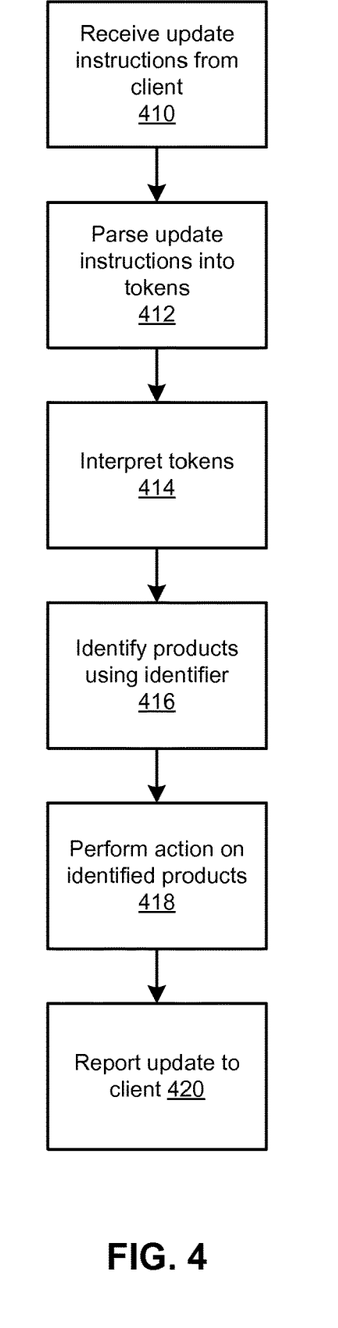
FIG. 4 is a flowchart illustrating a method of updating information in product database according to one embodiment.

FIG. 4 is a flowchart illustrating a method of updating information in a product database according to one embodiment. In the described embodiment, the steps of the method are performed by the update server 130. Different entities may perform some or all of the steps in other embodiments. Moreover, other embodiments perform the illustrated steps in different orders, and/or perform different or additional steps. Additionally, multiple instances of the steps may be performed in parallel.

The update server 130 receives 410 update instructions from a client 110. For example, a merchant may use the client 110 to interact with an input box to send update instructions to the update server 130. The update instructions specify an update to product information stored in a product database 160. For example, the update instructions may request an update of metadata associated with a product sold by the merchant in the electronic marketplace. In one embodiment, the update instructions are a text string containing an expression describing the update to perform. The update server 130 parses 412 the expression in the received update instructions into a set of tokens. The update server 130 interprets 414 the tokens to obtain one or more product identifiers, operators, and values. The identifier identifies one or more products and the operator and value collectively describe an action to perform to update product information for the identified products.

The update server 130 uses the product identifier in the update instructions to identify 416 a set of products having associated product information in the product database 160. For example, if the product identifier includes an ISBN, the update server 130 may identify the set of products sold by the merchant that provided the update instructions having the ISBN. The update server 130 performs 418 the action described by the operator and value on the products in the set. The action may include updating metadata in the product database 160 for the identified products. For example, the update server 130 may perform actions such as changing price metadata, updating cover image metadata, revising title metadata, or creating a new metadata tag.

Additionally, the update server 130 reports 420 the updates to the client 110. In one embodiment, the update server 130 provides a report listing products for which an action will be performed. The merchant can use the report to review and selectively alter the set of products on which the action will be performed. The update server 130 may also provide a report listing actions that were performed. The merchant can use this latter report to review and selectively undo the actions.

The use of the input box to provide update instructions to the update server 130 thus facilitates rapid updating of product metadata. The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A computer-implemented method for updating product information in a product database of an electronic marketplace, the method comprising:

storing in the product database, product information associated with respective products of the electronic marketplace;

receiving update instructions comprising a text string containing an expression specifying an update to product information stored in the product database;

parsing, by a computer, the expression contained in the update instructions into a set of tokens;

interpreting the set of tokens to obtain a product identifier identifying a set containing a plurality of products having associated product information in the product database;

interpreting the set of tokens to obtain an operator and a value, the operator describing a type of update to perform on the product information associated with the set of products, the value describing a new value for the product information being updated, and the operator and value collectively specifying an action to perform to update the product information associated with the set of products;

performing, by the computer, the specified action on the product information in the product database associated with the set of products to generate updated product information for the set of products; and storing the updated product information in the product database.

2. The method of claim 1, further comprising:

providing a user interface to a client computer, the user interface including an input box adapted to receive the text string containing the expression, the expression identifying the set of products having associated product information in the product database and the specified action to perform to update the product information associated with the set of products.

3. The method of claim 1, further comprising:
   determining a merchant identifier identifying a merchant from which the update instructions were received, the merchant selling products in the electronic marketplace; and
   using the merchant identifier and the product identifier to identify a set of products sold by the merchant in the electronic marketplace having associated product information in the product database;
   wherein the specified action is performed on the identified set of products sold by the merchant having associated product information in the product database and the specified action is not performed on products identified by the product identifier that are sold by other merchants.

4. The method of claim 1, wherein the update instructions specify an update to a price of a product associated with product information in the product database, the update to the price specified using a relative value, and performing the specified action comprises:
   determining a current price of the product specified by the associated product information in the product database;
   calculating a new price of the product responsive to the relative value and the current price; and
   updating the product information associated with the product in the product database to indicate the new price.

5. The method of claim 1, wherein the update instructions specify an update to product information according to date range, and performing the specified action comprises:
   performing the specified action on the product information at a beginning of the date range to change data in the product information from a first value to a second value; and
   restoring the changed data in the product information from the second value to the first value at an end of the date range.

6. The method of claim 1, wherein the update instructions are received from a client computer used by a merchant selling products in the electronic marketplace, and further comprising:
   providing a report to the client computer describing the set of products and specified action to be performed on product information of the products in the set; and
   receiving, from the client computer, a selection altering the set of products to produce an altered set of products;
   wherein the specified action is performed on the product information associated with the altered set of products.

7. The method of claim 1, further comprising:
   providing a user interface to a client computer, the user interface including an input box adapted to receive the text string containing the expression and adapted to receive a search query, the search query specifying a product identifier identifying a set of products having associated product information in the product database.

8. A non-transitory computer-readable storage medium storing computer program instructions for updating product information in a product database of an electronic marketplace, the computer program instructions executable to perform steps comprising:
   storing in the product database, product information associated with respective products of the electronic marketplace;
   receiving update instructions comprising a text string containing an expression specifying an update to product information stored in the product database;
   parsing, by a computer, the expression contained in the update instructions into a set of tokens;
   interpreting the set of tokens to obtain a product identifier identifying a set containing a plurality of products having associated product information in the product database;
   interpreting the set of tokens to obtain an operator and a value, the operator describing a type of update to perform on the product information associated with the set of products, the value describing a new value for the product information being updated, and the operator and value collectively specifying an action to perform to update the product information associated with the set of products;
   performing, by the computer, the specified action on the product information in the product database associated with the set of products to generate updated product information for the set of products; and
   storing the updated product information in the product database.

9. The computer-readable storage medium of claim 8, the steps further comprising:
   providing a user interface to a client computer, the user interface including an input box adapted to receive the text string containing the expression, the expression identifying the set of products having associated product information in the product database and the specified action to perform to update the product information associated with the set of products.

10. The computer-readable storage medium of claim 8, the steps further comprising:
    determining a merchant identifier identifying a merchant from which the update instructions were received, the merchant selling products in the electronic marketplace; and
    using the merchant identifier and the product identifier to identify a set of products sold by the merchant in the electronic marketplace having associated product information in the product database;
    wherein the specified action is performed on the identified set of products sold by the merchant having associated product information in the product database and the specified action is not performed on products identified by the product identifier that are sold by other merchants.

11. The computer-readable storage medium of claim 8, wherein the update instructions specify an update to a price of a product associated with product information in the product database, the update to the price specified using a relative value, and performing the specified action comprises:
    determining a current price of the product specified by the associated product information in the product database;
    calculating a new price of the product responsive to the relative value and the current price; and
    updating the product information associated with the product in the product database to indicate the new price.

12. The computer-readable storage medium of claim 8, wherein the update instructions specify an update to product information according to date range, and performing the specified action comprises:

performing the specified action on the product information at a beginning of the date range to change data in the product information from a first value to a second value; and restoring the changed data in the product information from the second value to the first value at an end of the date range.

13. The computer-readable storage medium of claim 8, wherein the update instructions are received from a client computer used by a merchant selling products in the electronic marketplace, the steps further comprising:

providing a report to the client computer describing the set of products and specified action to be performed on product information of the products in the set; and receiving, from the client computer, a selection altering the set of products to produce an altered set of products;

wherein the specified action is performed on the product information associated with the altered set of products.

14. A computer system for updating product information in a product database of an electronic marketplace, the computer system comprising:

a non-transitory computer-readable storage medium storing computer program instructions executable to perform steps comprising receiving update instructions comprising a text string containing an expression specifying an update to product information stored in the product database;

parsing the expression into a set of tokens;

interpreting the set of tokens to obtain a product identifier identifying a set containing a plurality of products having associated product information in the product database;

interpreting the set of tokens to obtain an operator and a value, wherein the operator describes a type of update to perform on product information in the product database, the value describes a new value for the product information being updated, and the operator and value collectively specify an action to perform to update the product information associated with the set of products; and performing the specified action on the product information associated with the set of products; and a processor for executing the computer program instructions.

15. The system of claim 14, the steps further comprising:

providing a user interface to a client computer, the user interface including an input box adapted to receive the text string containing the expression, the expression identifying the set of products having associated product information in the product database and the specified action to perform to update the product information associated with the set of products.

16. The system of claim 14, the steps further comprising:

determining a merchant identifier identifying a merchant from which the update instructions were received, the merchant selling products in the electronic marketplace; and using the merchant identifier and the product identifier to identify a set of products sold by the merchant in the electronic marketplace having associated product information in the product database;

wherein the specified action is performed on the identified set of products sold by the merchant having associated product information in the product database and the specified action is not performed on products identified by the product identifier that are sold by other merchants.

17. The system of claim 14, wherein the update instructions specify an update to a price of a product associated with product information in the product database, the update to the price specified using a relative value, and performing the specified action comprises:

determining a current price of the product specified by the associated product information in the product database;

calculating a new price of the product responsive to the relative value and the current price; and updating the product information associated with the product in the product database to indicate the new price.

18. The method of claim 1, wherein the product identifier identifies a set containing a plurality of products having associated product information in the product database.

* * * * *